(12) United States Patent
Kaino et al.

(10) Patent No.: US 11,745,752 B2
(45) Date of Patent: Sep. 5, 2023

(54) VEHICLE CONTROL SYSTEM

(71) Applicant: Mazda Motor Corporation, Hiroshima (JP)

(72) Inventors: Akira Kaino, Aki-gun (JP); Yoshitaka Fujihara, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 295 days.

(21) Appl. No.: 17/203,783

(22) Filed: Mar. 17, 2021

(65) Prior Publication Data

US 2021/0323568 A1 Oct. 21, 2021

(30) Foreign Application Priority Data

Apr. 17, 2020 (JP) .................................. 2020-074225

(51) Int. Cl.
| | |
|---|---|
| *B60W 30/18* | (2012.01) |
| *B60W 40/08* | (2012.01) |
| *B60W 50/14* | (2020.01) |
| *B60W 60/00* | (2020.01) |

(52) U.S. Cl.
CPC ...... *B60W 50/14* (2013.01); *B60W 30/18163* (2013.01); *B60W 40/08* (2013.01); *B60W 30/18159* (2020.02); *B60W 2050/146* (2013.01)

(58) Field of Classification Search
CPC ........... B60W 50/14; B60W 30/18163; B60W 40/08; B60W 30/18159; B60W 2050/146; B60W 60/001; B60W 2540/26; B60Y 2302/05

USPC ........................................................ 701/70
See application file for complete search history.

(56) References Cited

U.S. PATENT DOCUMENTS

| | | | |
|---|---|---|---|
| 2014/0121927 A1 | 5/2014 | Hanita | |
| 2016/0185348 A1* | 6/2016 | Miura | B60W 30/08 |
| | | | 701/41 |
| 2017/0369076 A1* | 12/2017 | Goo | B60W 10/22 |
| 2018/0111628 A1* | 4/2018 | Tamagaki | B60W 50/12 |
| 2018/0134262 A1* | 5/2018 | Kurahashi | B60K 35/00 |
| 2021/0300403 A1* | 9/2021 | Kuwabara | B60W 60/0057 |

FOREIGN PATENT DOCUMENTS

| | | |
|---|---|---|
| JP | 2018-79707 A | 5/2018 |
| JP | 2019-43365 A | 3/2019 |
| WO | 2013/008300 A1 | 1/2013 |

\* cited by examiner

*Primary Examiner* — Abby Y Lin
*Assistant Examiner* — Hossam M Abd El Latif
(74) *Attorney, Agent, or Firm* — XSENSUS LLP

(57) ABSTRACT

A vehicle control system can have an in-vehicle camera that monitors a state of the driver; a center display and a meter device that notify the occupant of information; and a controller that executes automatic stop control in the case where the driver abnormality is determined. The controller can perform: a first operation to decelerate the vehicle to a specified speed when the abnormality is determined; a second operation to further decelerate and stop the vehicle after the first operation; a third operation to change a lane of the vehicle between the first operation and the second operation; and a fourth operation to move the vehicle to a road shoulder between the first operation and the second operation. The controller can notify the operation performed, and notify of a stop of the operation in the case where the operation performed is stopped.

20 Claims, 9 Drawing Sheets

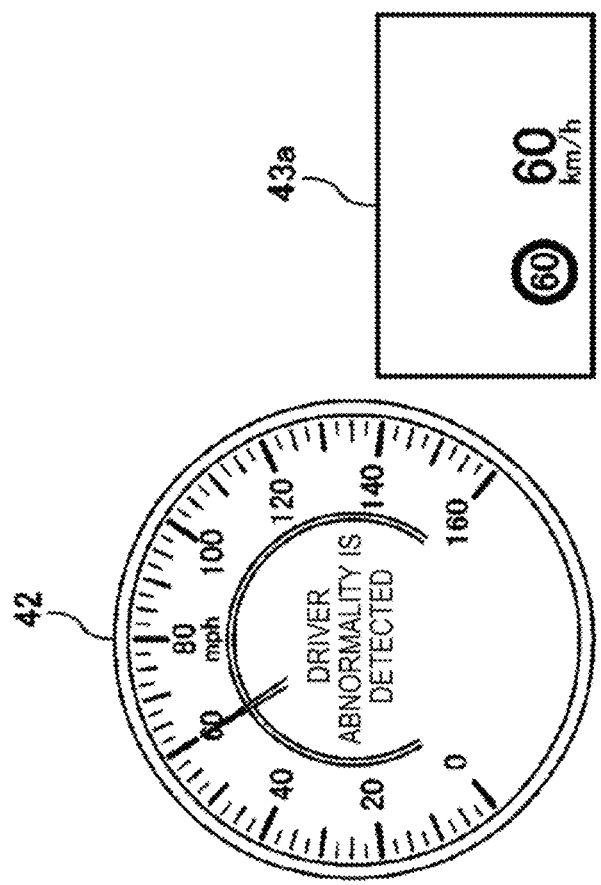
FIG. 4A
FIG. 4B
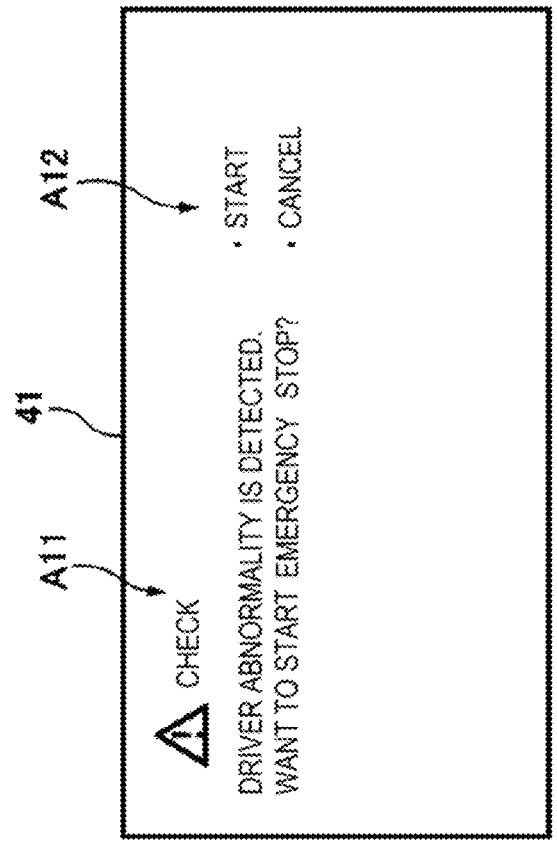
FIG. 4C

VEHICLE CONTROL SYSTEM

CROSS-REFERENCE TO RELATED APPLICATION

The present application claims priority to Japanese App. No. 2020-074225 filed Apr. 17, 2020, the entire content and disclosure of which is incorporated by reference herein in its entirety.

TECHNICAL FIELD

Embodiments of the present disclosure relate to a vehicle control system that can automatically stop a vehicle emergently when abnormality occurs to a driver during travel.

BACKGROUND ART

Patent document 1 describes a technique of alleviating a confusion of a driver that is caused in association with timing of activation or cancellation of the automatic stop by displaying information on a situation of an activation determination of the automatic stop or information on a situation of a cancellation determination thereof in the case where an automatic stop is executed. In addition, this Patent document 1 describes that a required operation is displayed in order to activate or cancel the automatic stop. Patent document 2 describes that a switch used to initiate or cancel the automatic stop is displayed on a touchscreen. Patent document 3 describes that notification is made to cause an occupant other than the driver to recognize that the automatic stop is currently executed.

PRIOR ART DOCUMENTS

Patent Documents

[Patent document 1] JP-A-2018-79707
[Patent document 2] JP-A-2019-43365
[Patent document 3] WO 2013/008300

SUMMARY

A vehicle control system can comprise: a driver monitoring device that monitors a state of a driver; a notification device that notifies an occupant including the driver of specified information visually and/or auditorily; and a controller configured to execute automatic stop control to automatically stop a vehicle emergently and execute control to cause the notification device to notify of information regarding the automatic stop control where the driver abnormality is determined based on the driver state monitored by the driver monitoring device. The controller can be configured to perform, as the automatic stop control, a first operation to decelerate the vehicle to a specified vehicle speed when the driver abnormality is determined, a second operation to further decelerate and stop the vehicle after the first operation, a third operation to change a lane of the vehicle between the first operation and the second operation, and a fourth operation to move the vehicle to a road shoulder between the first operation and the second operation. The controller can be further configured to cause the notification device to notify of an operation to be performed from now on of the first to fourth operations and to cause the notification device to notify of a stop of the operation in the case where the operation to be performed from now on of the first to fourth operations is stopped.

BRIEF DESCRIPTION OF THE DRAWINGS

FIGS. 4A-4C illustrate screen examples that may be shown when a driver abnormality occurs in one or more embodiments of the present disclosure.

DETAILED DESCRIPTION

Figure 1:
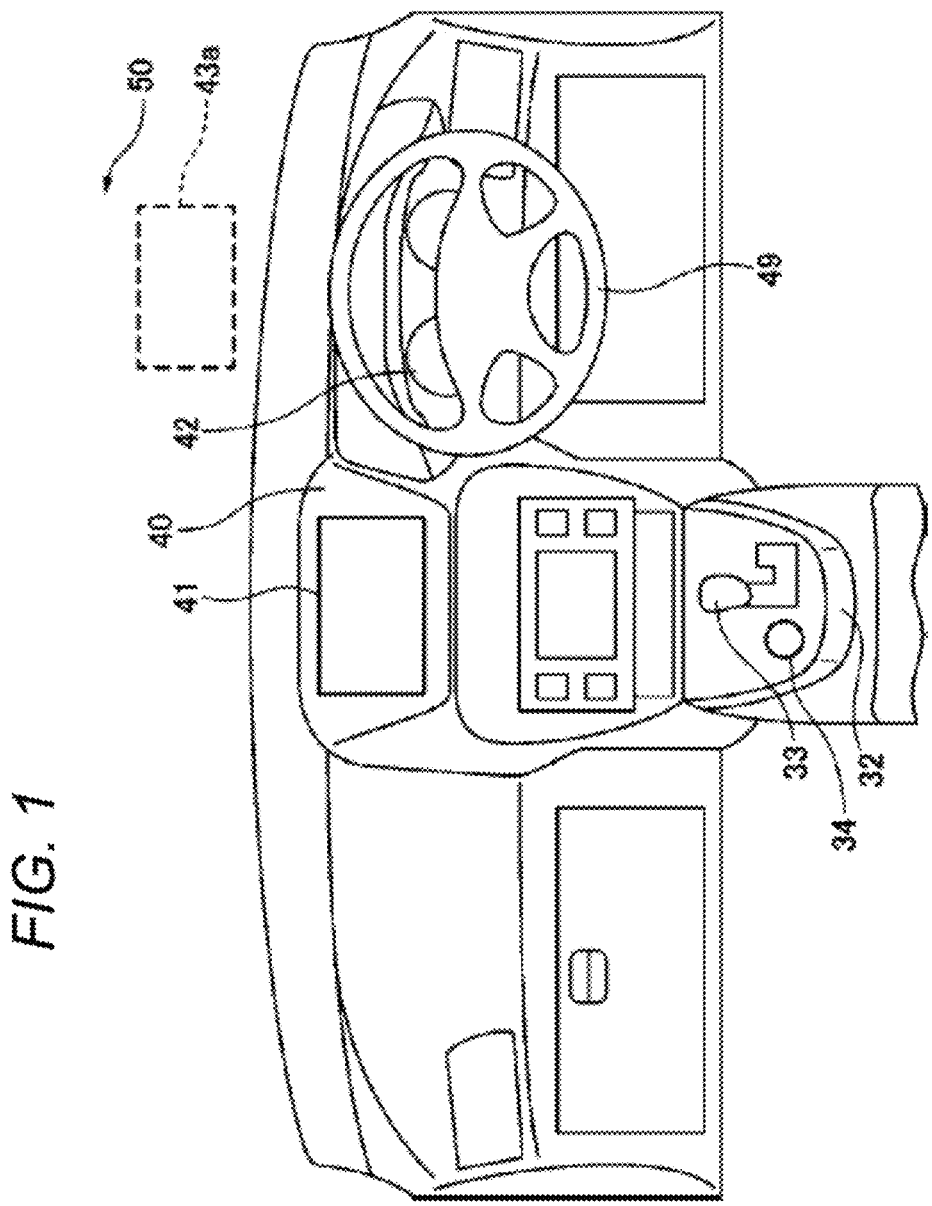
FIG. 1 is a schematic view illustrating a cabin space of a vehicle, to which a vehicle control system according to one or more embodiments of the present disclosure can be adopted.

A description will hereinafter be made on a vehicle control system according to one or more embodiments of the present disclosure with reference to the accompanying drawings.

By the way, in the case where an abnormality occurs to the driver, and thus the automatic stop is executed, the occupants including the driver may tend to feel anxious about when the vehicle is stopped and where the vehicle is stopped. In particular, the occupant other than the driver may wish to promptly stop the vehicle and save the driver, and thus may wish to comprehend when the vehicle is stopped.

Accordingly, it can be considered that, during the automatic stop, the occupants including the driver can be desirably and sequentially notified of operation of the vehicle to be performed in the future (including operation, performance of which is being attempted), operation of the vehicle that is stopped as being unperformable (for example, a lane change that cannot be made due to a surrounding situation of a host vehicle), and the like.

Embodiments of the present disclosure have been made to solve the above-described problem and other problems, and, therefore, can have a purpose, in addition to other purposes, of providing a vehicle control system capable of sequentially notifying an occupant of various control aspects that can be adopted by a vehicle during automatic stop control in the case where abnormality occurs to a driver and this automatic stop control can thereby be executed.

In order to achieve at least the above purpose, one or more embodiments of the present disclosure can provide a vehicle control system that can have: a driver monitoring device that monitors a state of a driver; a notification device that notifies an occupant including the driver of specified information visually and/or auditorily; and a controller configured to execute automatic stop control for automatically stopping a vehicle emergently and execute control for causing the notification device to notify of information on the automatic stop control in the case where the driver abnormality is determined on the basis of the driver state monitored by the driver monitoring device. The controller can be configured to perform, as the automatic stop control, (1) a first operation to decelerate the vehicle to a specified vehicle speed when the driver abnormality is determined, (2) a second operation to further decelerate and stop the vehicle after the first operation, (3) a third operation to change a lane of the vehicle between the first operation and the second operation, and (4) a fourth operation to move the vehicle to a road shoulder between the first operation and the second operation. The controller can be further configured to cause the notification device to notify of the operation to be performed from now on of the first to fourth operations and to cause the notification device to notify of a stop of the operation in the case where the operation to be performed from now on of the first to fourth operations is stopped.

Thus, according to one or more embodiments of the present disclosure, when the abnormality occurs to the driver, and the automatic stop control is thereby executed, it can be possible to sequentially notify the occupant including the driver of the vehicle of various control aspects that can be adopted by the vehicle during this automatic stop control. More specifically, it can be possible to sequentially notify the occupant of the operation to be performed (including operation, performance of which is being attempted), the operation of the vehicle that is stopped as being unperformable (for example, a lane change that cannot be made due to a surrounding situation of the vehicle), and the like. In this way, the occupant can sequentially comprehend the control aspect that can be adopted by the vehicle during the automatic stop control. Therefore, it can be possible to dispel the occupant's anxiety about future behavior of the vehicle, that is, it can be possible to give the occupant a sense of safety.

In one or more embodiments of the present disclosure, the controller can be configured to cause the notification device to notify that the third or fourth operation is stopped and that the second operation is performed from now on in the case where the third or fourth operation is stopped and thereafter to perform the second operation so as to stop the vehicle at a position other than a position in a lane change destination or a position other than the road shoulder.

Thus, according to one or more embodiments of the present disclosure, in the case where the third or fourth operation is stopped, the occupant can appropriately comprehend that the vehicle is stopped at the position other than that in the lane change destination or at the position other than the road shoulder, typically, that the vehicle is stopped in the own lane.

In one or more embodiments of the present disclosure, the controller can be configured to: cause the notification device to notify that the vehicle is stopped within a specified time when the first operation is performed; and cause the notification device to notify that the third or fourth operation is stopped and that the second operation is performed from now on in the case where the third or fourth operation cannot be performed within the specified time and thereafter to perform the second operation so as to stop the vehicle within the specified time.

Thus, according to one or more embodiments of the present disclosure, in the case where an elapsed time from initiation of the automatic stop control approaches the specified time (a limit time), but the third or fourth operation cannot be performed, the controller can notify of such a circumstance and then stop the vehicle. In this way, in the case where the third or fourth operation cannot be performed within the specified time, the occupant can appropriately comprehend that the vehicle is promptly stopped from now on, typically, that the vehicle is promptly stopped in an own lane.

In one or more embodiments of the present disclosure, the controller can be configured to cause the notification device to notify that the second operation is performed from now on in the case where an intersection exists ahead of the vehicle after the first operation and thereafter to perform the second operation so as to stop the vehicle before the vehicle enters the intersection.

Thus, according to one or more embodiments of the present disclosure, the occupant can appropriately comprehend that, after the vehicle is stopped before entering the intersection, the vehicle remains stopped and thus does not start again.

In one or more embodiments of the present disclosure, the controller can be configured to cause the notification device to notify that the second operation is performed from now on in the case where the vehicle is temporarily stopped according to a surrounding situation after the first operation and thereafter to perform the second operation so as to stop the vehicle according to the surrounding situation.

Thus, according to one or more embodiments of the disclosed subject matter, the occupant can appropriately comprehend that, after the vehicle is stopped according to the surrounding situation (for example, a location where the vehicle should be stopped temporarily due to a signal, a level crossing, or a traffic regulation, heavy traffic, or the like), the vehicle remains stopped and thus does not start again.

According to the vehicle control system according to one or more embodiments of the present disclosure, it can be possible to sequentially notify the occupant of the various control aspects that can be adopted by the vehicle during the automatic stop control in the case where the abnormality occurs to the driver and this automatic stop control is thereby executed.

[Configuration of Vehicle Control System]

Figure 2:
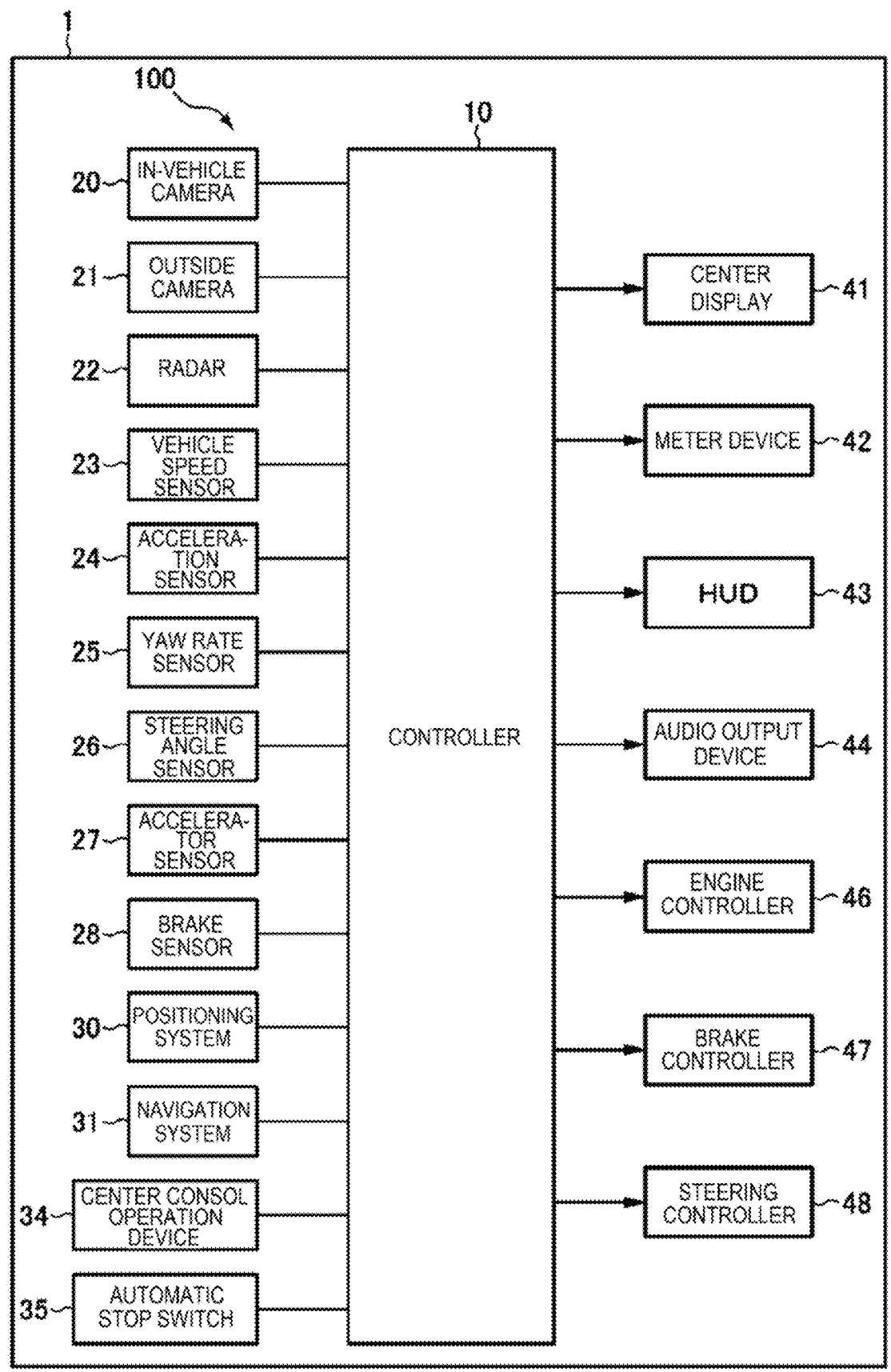
FIG. 2 is a block diagram illustrating a schematic configuration of a vehicle control system according to one or more embodiments of the present disclosure.

First, a description will be made on a configuration of a vehicle control system according to one or more embodiments of the present disclosure with reference to FIG. 1 and FIG. 2. FIG. 1 is a schematic view illustrating a cabin space of a vehicle, to which a vehicle control system according to one or more embodiments of the present disclosure can be applied. FIG. 2 is a block diagram illustrating a schematic configuration of a vehicle control system according to one or more embodiments of the present disclosure.

As illustrated in FIG. 1, a cabin is provided with an instrument panel 40, on which a center display 41 and a meter device 42 are mounted, a center console 32, and the like. The center display 41 is provided at a position that is in front of a driver's seat and a passenger's seat and is substantially central in a vehicle width direction, and is constructed of a liquid crystal display (LCD). The meter device 42 is provided in front of a steering wheel 49 and includes gauges displaying a speed, an engine speed, a gear range, and the like. The center console 32 is provided with: a range operation device 33 for switching a range of an automatic transmission; and a center console operation device 34 that is operated to select any of various options shown on the center display 41, and the like. In one example, the center console operation device 34 is constructed of a dial-type rotary switch.

In addition, FIG. 1 schematically illustrates an image 43a (in other words, an image area) that is shown on a front windshield 50 by a head-up display (HUD) 43 illustrated in FIG. 2. Strictly speaking, this image 43a corresponds to a virtual image that is projected by the HUD 43 and is visually recognized by a driver via the front windshield 50, and will hereinafter be referred to as an "HUD image". The device of the HUD 43 itself is mounted on the dashboard, for example.

Next, as illustrated in FIG. 2, a vehicle control system 100 can have: a controller 10 including an electronic control unit (ECU) and the like; plural types of sensors, each of which outputs a specified signal to the controller 10; and plural devices, each of which is controlled by a control signal received from the controller 10. The vehicle control system 100 can be configured to execute automatic stop control for automatically stopping a vehicle (hereinafter appropriately referred to as a "host vehicle") 1 emergently when determining the driver abnormality during travel of the vehicle 1.

More specifically, the plural types of the sensors are an in-vehicle camera 20, an outside camera 21, a radar 22, a vehicle speed sensor 23 for detecting behavior of the vehicle 1 and a driving operation by an occupant, an acceleration sensor 24, a yaw rate sensor 25, a steering angle sensor 26, an accelerator sensor 27, and a brake sensor 28. The plural types of the sensors further include a positioning system 30 for detecting a position of the vehicle 1, a navigation system 31, a center console operation device 34, and an automatic stop switch 35. The plural devices that are controlled by the controller 10 are the center display 41, the meter device 42, the HUD 43, an audio output device 44, an engine controller 46, a brake controller 47, and a steering controller 48. The controller 10 is constructed of a computer that includes one or more processors (typically CPUs), memory (ROM, RAM, or the like) for storing various programs, an input/output device, and the like.

The in-vehicle camera 20 captures an image of inside of the cabin, in particular, an image of the driver, and outputs image data. The controller 10 analyzes a posture and the like of the driver on the basis of the image data received from the in-vehicle camera 20, and thereby determines whether the driver is abnormal. For example, in the case where the analyzed posture of the driver is a posture that cannot be assumed at the when the driver normally drives the vehicle 1, the controller 10 determines that the driver is abnormal. The in-vehicle camera 20 corresponds to an example of the "driver monitoring device" in one or more embodiments of the present disclosure.

The outside camera 21 captures an image around the vehicle 1 and outputs image data. Based on the image data received from the outside camera 21, the controller 10 identifies objects (for example, a preceding vehicle (a front vehicle), a following vehicle (a rear vehicle), a parked vehicle, a pedestrian, a travel road, road marking lines (a lane divider, a white line, and a yellow line), a traffic signal, a traffic sign, a stop line, an intersection, an obstacle, and the like). The controller 10 may acquire information on the object from the outside through a traffic infrastructure, inter-vehicle communication, or the like. In this way, a type, a relative position, a moving direction, and the like of the object can be identified.

The radar 22 measures a position and a speed of the object (particularly, the preceding vehicle, the following vehicle, the parked vehicle, the pedestrian, a dropped object on the travel road, or the like). For example, a millimeter-wave radar can be used as the radar 22. The radar 22 transmits a radio wave in an advancing direction of the vehicle 1, and receives a reflected wave that is generated when the object reflects the transmitted wave. Then, based on the transmitted wave and the received wave, the radar 22 measures a distance between the vehicle 1 and the object (for example, an inter-vehicular distance) and a relative speed of the object to the vehicle 1. Instead of such a radar 22, a laser radar, an ultrasonic sensor, or the like may be used to measure the distance from and the relative speed of the object. Alternatively, plural types of sensors may be used to constitute a position and speed measuring device.

Here, based on travel road information and obstacle information that are acquired by the outside camera 21 and the radar 22 described above, the controller 10 can execute automated driving control of the vehicle 1, more specifically, the automatic stop control for automatically stopping the vehicle 1 emergently. For example, the travel road information includes information on a shape of the travel road (a straight road, a curved road, or a curvature of the curved road), a travel road width, the number of lanes, a lane width, regulation information of the travel road designated on the traffic sign or the like (a speed limit or the like), the intersection, a crosswalk, and the like. The obstacle information includes information on presence or absence of the obstacle on the travel road of the vehicle 1 (for example, the object such as the preceding vehicle, the following vehicle, the parked vehicle, or the pedestrian that can possibly be the obstacle in travel of the vehicle 1), a moving direction of the obstacle, a moving speed of the obstacle, and the like.

The vehicle speed sensor 23 detects an absolute speed of the vehicle 1. The acceleration sensor 24 detects acceleration of the vehicle 1. This acceleration includes acceleration in a longitudinal direction and acceleration in a lateral direction (that is, lateral acceleration). The acceleration includes not only a change rate of the speed in a speed increasing direction but also a change rate of the speed in a speed reducing direction (that is, deceleration).

The yaw rate sensor 25 detects a yaw rate of the vehicle 1. The steering angle sensor 26 detects a rotation angle (a steering angle) of steering of the vehicle 1. The controller 10 performs a specified calculation on the basis of the absolute speed, which is detected by the vehicle speed sensor 23, and the steering angle, which is detected by the steering angle sensor 26, and can thereby acquire a yaw angle of the vehicle 1. The accelerator sensor 27 detects an operation of an accelerator pedal by a driver, more specifically, a depression amount of the pedal (an accelerator operation amount). The brake sensor 28 detects an operation of a brake pedal by the driver, more specifically, a depression amount of the pedal.

The positioning system 30 is a GPS system and/or a gyroscopic system, and detects the position of the vehicle 1 (current vehicle position information). The navigation system 31 stores map information therein and can provide the map information to the controller 10. Based on the map information and the current vehicle position information, the controller 10 identifies a road, the intersection, the traffic signal, a building, and the like that exist around (particularly, in the advancing direction of) the vehicle 1. The map information may be stored in the controller 10. The navigation system 31 also acquires the travel road information described above.

The center console operation device 34 is provided in the center console 32 as illustrated in FIG. 1 and is operated to select any of the various options shown on the center display 41, and the like. The automatic stop switch 35 is a switch that is operated to automatically stop the vehicle 1. This automatic stop switch 35 is provided at such a position in the cabin that the driver himself/herself can operate when the driver feels his/her own abnormality.

The center display 41, the meter device 42, and the HUD 43 are as described with reference to FIG. 1. The audio output device 44 is constructed of a speaker that outputs audio to the inside of the cabin, and the like. Here, the center display 41, the meter device 42, the HUD 43, and the audio output device 44 each correspond to the "notification device" in one or more embodiments of the present disclosure.

The engine controller 46 controls an engine of the vehicle 1. The engine controller 46 is a component capable of regulating engine output (driving force) and, for example, includes an ignition plug, a fuel injection valve, a throttle valve, a variable valve mechanism that changes opening/closing timing of each of intake and exhaust valves, and the like. When the vehicle 1 has to be accelerated or decelerated, the controller 10 sends the control signal to the engine controller 46 so as to change the engine output.

The brake controller 47 controls a brake system of the vehicle 1. The brake controller 47 is a component capable of regulating a braking force of the brake system and, for example, includes a hydraulic pump, a valve unit, and the like. When the vehicle 1 has to be decelerated, the controller 10 sends the control signal to the brake controller 47 so as to generate the braking force.

The steering controller 48 controls a steering system of the vehicle 1. The steering controller 48 is a component capable of regulating the steering angle of the vehicle 1 and, for example, includes an electric motor for an electric power steering system, and the like. When the advancing direction of the vehicle 1 has to be changed, the controller 10 sends the control signal to the steering controller 48 so as to change a steering direction.

[Automatic Stop Control]

Figure 3:
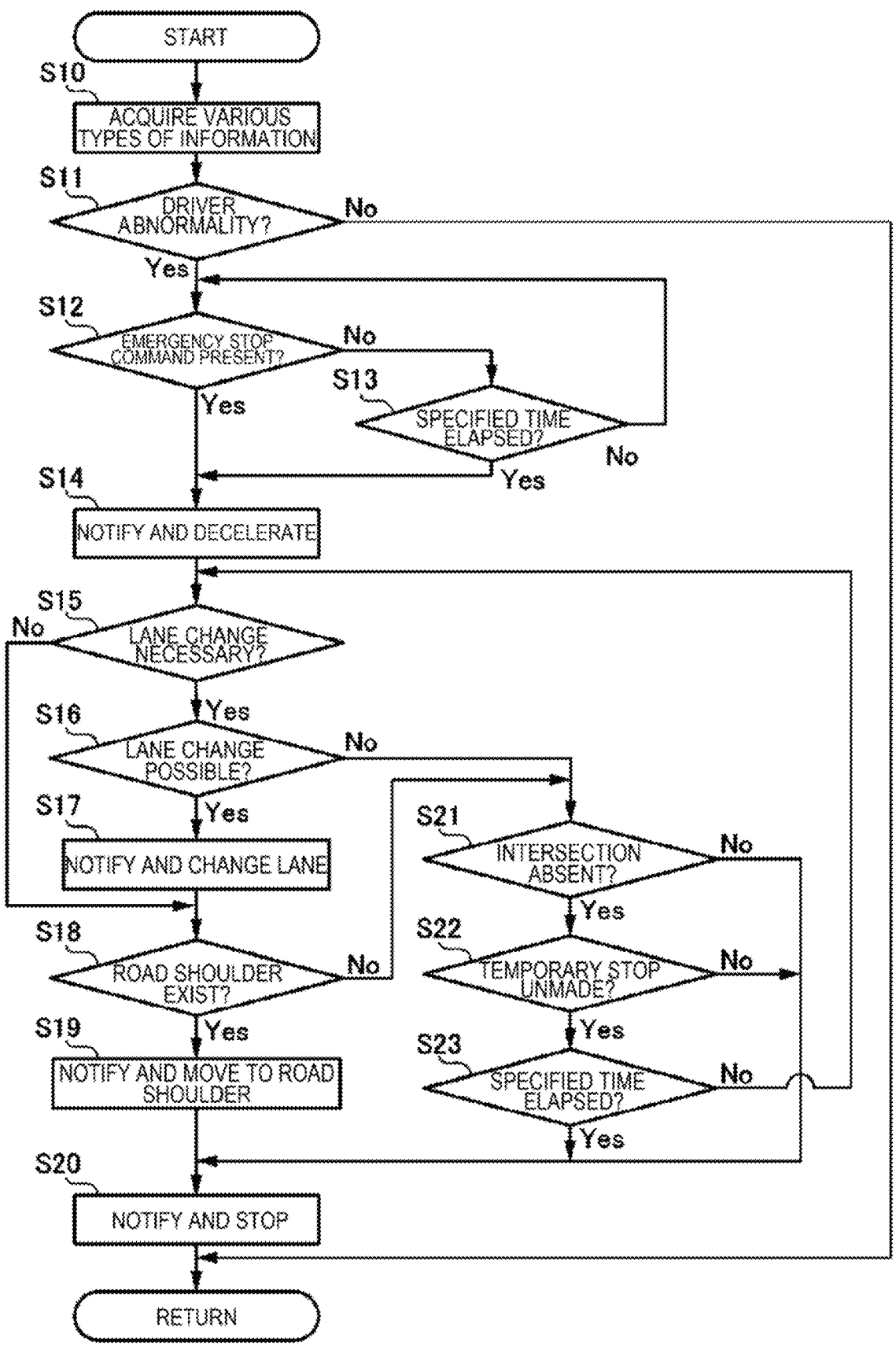
FIG. 3 is a flowchart illustrating automatic stop control according to one or more embodiments of the present disclosure.

Next, a specific description will be made on the automatic stop control according to one or more embodiments of the present disclosure with reference to FIG. 3 to FIG. 9C. FIG. 3 is a flowchart illustrating the automatic stop control according to one or more embodiments of the present disclosure, and FIG. 4A to FIG. 9C each illustrate a screen (or screens or screen portions) that may be shown at respective one of various stages in the automatic stop control according to one or more embodiments of the present disclosure. More specifically, in FIG. 4A to FIG. 9C, Chart (A), i.e., the left-most screen, illustrates information that may be shown by the center display 41, Chart (B), i.e., the center screen, illustrates information that may be shown by the meter device 42, and Chart (C), i.e., the right-most screen, illustrates information that may be shown by the HUD 43, that is, the HUD image 43a. In particular, Chart (B) in each of FIG. 4B to FIG. 9B illustrates only a portion corresponding to a speedometer in the meter device 42, and the HUD image 43a in Chart (C) in each of FIG. 4C to FIG. 9C shows an example in which only a speed limit and a current vehicle speed are usually shown for convenience of description (in reality, various contents other than these can be shown).

Processing related to the flowchart illustrated in FIG. 3 can be repeatedly executed by the controller 10 in specified cycles. First, in step S10, the controller 10 can acquire various types of the information from the plural types of the sensors illustrated in FIG. 2.

Next, in step S11, the controller 10 can determine whether the abnormality occurs to the driver, in other words, can determine whether the driver is in a state where it is difficult for the driver to drive the vehicle 1. In a typical example, the controller 10 can analyze the posture of the driver (a posture of the driver's head) on the basis of the image of the driver, which is captured by the in-vehicle camera 20, and determine whether the driver is abnormal. More specifically, in the case where the analyzed posture of the driver is the posture that cannot be assumed at the when the driver normally drives the vehicle 1, the controller 10 can determine that the driver is abnormal. In another example, in the case where the steering angle, which is detected by the steering angle sensor 26, is changed in a manner that cannot occur in the normal travel, the controller 10 can determine that the driver is abnormal (in this example, the steering angle sensor 26 corresponds to the "driver monitoring device" in one or more embodiments of the present disclosure. In further another example, the controller 10 can determine whether the driver is abnormal on the basis of a characteristic of saliency of a person. More specifically, in the case where a specified visual stimulus is presented in front of the driver, but a sightline direction of the driver is not appropriately shifted to the visual stimulus, the controller 10 can determine that the driver is abnormal. As a result of such step S11, if the abnormality does not occur to the driver (step S11: No), the controller 10 can terminate the processing related to the flowchart illustrated in FIG. 3.

On the other hand, if the abnormality occurs to the driver (step S11: Yes), the processing proceeds to step S12. In this case, the controller 10 can cause the audio output device 44 to output advanced driver-assistance systems (ADAS) warning sound about three times. In addition, the controller 10 can provide a screen as illustrated in FIGS. 4A-4C.

FIGS. 4A-4C illustrate screen examples that may be displayed when the driver abnormality occurs in one or more embodiments of the present disclosure. In this case, as indicated by a reference sign and symbol A11 in Chart (A), i.e., FIG. 4A, the controller 10 can cause the center display 41 to show a message, "CHECK", that calls attention of the occupant, a message, "DRIVER ABNORMALITY IS DETECTED.", that notifies of the driver abnormality, and a message, "WANT TO START EMERGENCY STOP?", that inquires about whether to execute the automatic stop control. In addition, as indicated by Chart (B), i.e., FIG. 4B, the controller 10 can cause the meter device 42 to show a message, "DRIVER ABNORMALITY IS DETECTED". Meanwhile, the controller 10 can provide the information that is usually shown in the HUD image 43a. Furthermore, as indicated by a reference sign and symbol A12 in Chart (A), i.e., FIG. 4A, the controller 10 can cause the center display 41 to show options to execute or stop the automatic stop control. More specifically, the center display 41 can show the options (in other words, a menu) of "START" and "CANCEL" for the automatic stop control. The thus-shown options on the center display 41 can be selected by operating the center console operation device 34. One of the options selected by the operation of the center console operation device 34 is shown in a different mode (for example, a color thereof is changed) from the other option that is not selected. In this way, an operator can distinguish presence or absence of the selection.

Next, in step S12, the controller 10 can determine whether a command to execute the automatic stop control (an emergency stop command) is present. In the case where the occupant including the driver selects the option of "START", which is shown in the center display 41, by operating the center console operation device 34, the controller 10 determines that the emergency stop command is present (step S12: Yes), and the processing proceeds to step S14. On the other hand, if such an emergency stop command is absent (step S12: No), the processing proceeds to step S13. In step S13, the controller 10 determines whether a specified time (for example, approximately three seconds) has elapsed since the driver abnormality is determined. As a result, if the specified time has elapsed (step S13: Yes), the processing proceeds to step S14 even without the emergency stop command. On the other hand, if the specified time has not elapsed (step S13: No), the processing returns to step S12. In this case, the controller 10 repeats the determinations in steps S12, S13 until a lapse of the specified time.

In addition, in the case where the driver operates the automatic stop switch 35, that is, in the case where the driver feels his/her own abnormality and turns on the automatic stop switch 35 to execute the automatic stop control, regardless of the processing in above steps S11 to S13, the controller 10 can execute processing in step S14 onward.

Figure 5C:
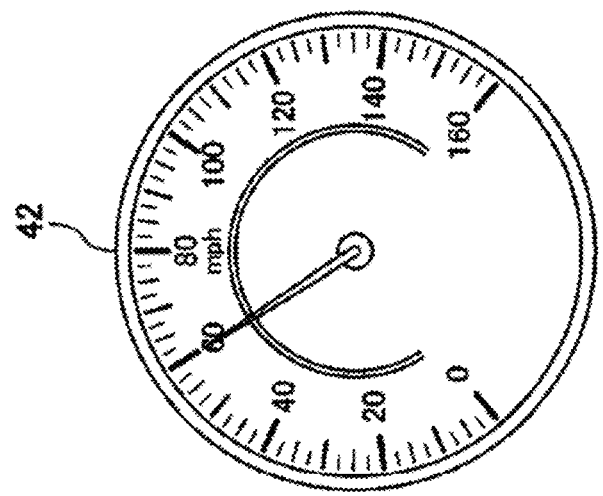
FIGS. 5A-5C illustrate screen examples that may be shown when selection to cancel the automatic stop control is made in one or more embodiments of the present disclosure.
Figure 5B:
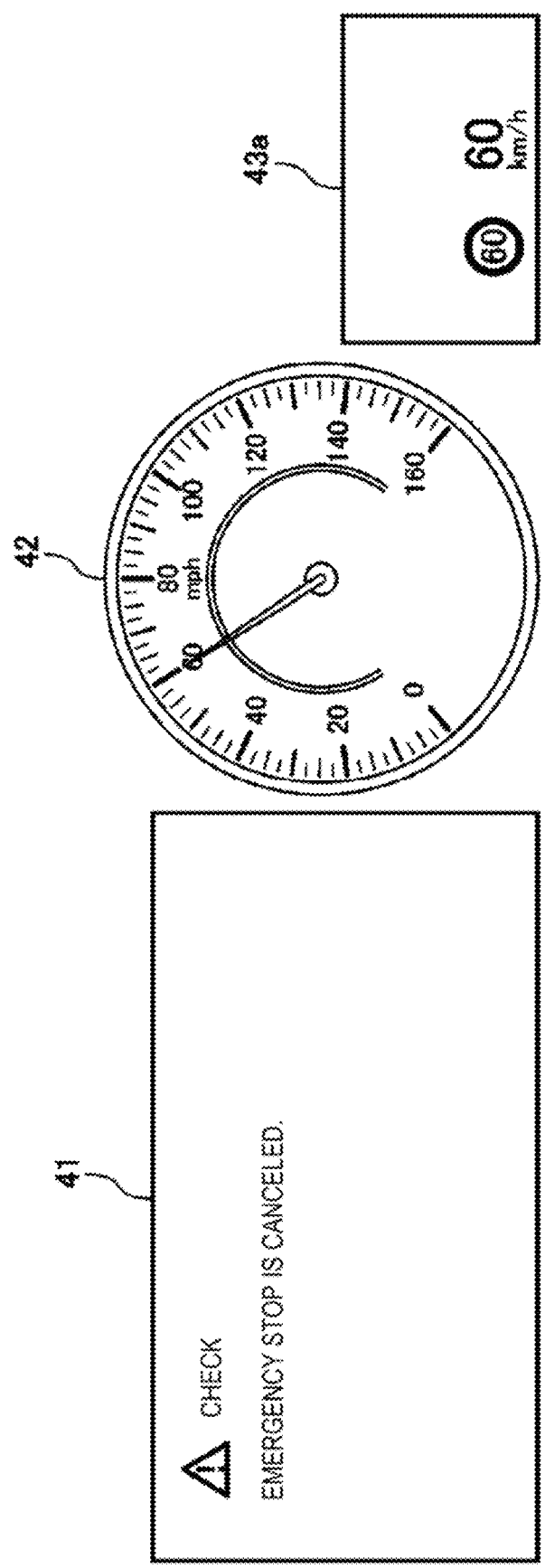
Figure 5A:
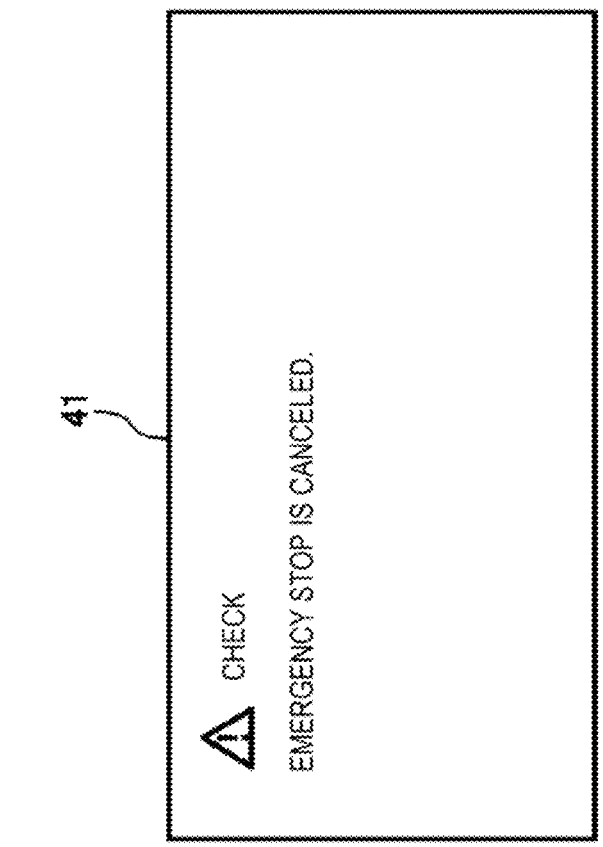

Meanwhile, in the case where the option of "CANCEL", which is shown in the center display 41, is selected through the operation of the center console operation device 34, the controller 10 can cause the audio output device 44 to output a message, "The vehicle stop by automated travel is cancelled.", and provides a screen as illustrated in FIGS. 5A-5C. FIGS. 5A-5C illustrate screen examples that may be shown when selection to cancel the automatic stop control is made in one or more embodiments of the present disclosure. In this case, as illustrated in Chart (A), i.e., FIG. 5A, the controller 10 can show a message, "EMERGENCY STOP IS CANCELED.", that notifies of cancellation of the automatic stop control on the center display 41. Meanwhile, the controller 10 can provide the information that is usually shown in meter device 42 and the HUD image 43a. This can make the driver promptly perform normal driving.

Next, in step S14, the controller 10 can initiate the automatic stop control. In this way, the controller 10 can automatically stop the vehicle 1 at a safe location within a specified limit time (for example, three minutes). More specifically, in step S14, the controller 10 makes specified notification, and then decelerates the vehicle 1 to approximately 10 km/h. In particular, the controller 10 causes the audio output device 44 to output a message, "The vehicle is automatically stopped at a safe location within three minute.", and a message, "The vehicle is decelerating to 10 km/h". In addition, the controller 10 turns on a hazard warning lamp of the vehicle 1, blows a horn, and blinks a brake lamp to notify vehicles around the vehicle 1 that the vehicle 1 is under the automatic stop control. The controller 10 keeps turning on of the hazard warning lamp, keeps blowing the horn, and keeps blinking the brake lamp, just as described, until the vehicle 1 is finally stopped. In addition, the controller 10 can provide a screen as illustrated in FIGS. 6A-6C.

Figure 6A:
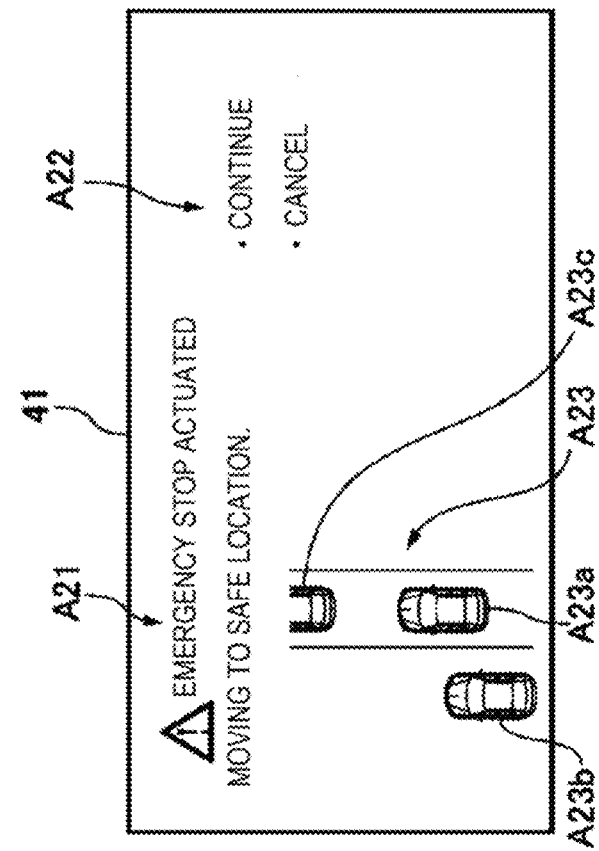
FIGS. 6A-6C illustrate screen examples that may be shown during automatic travel in the automatic stop control in one or more embodiments of the present disclosure.
Figure 6B:
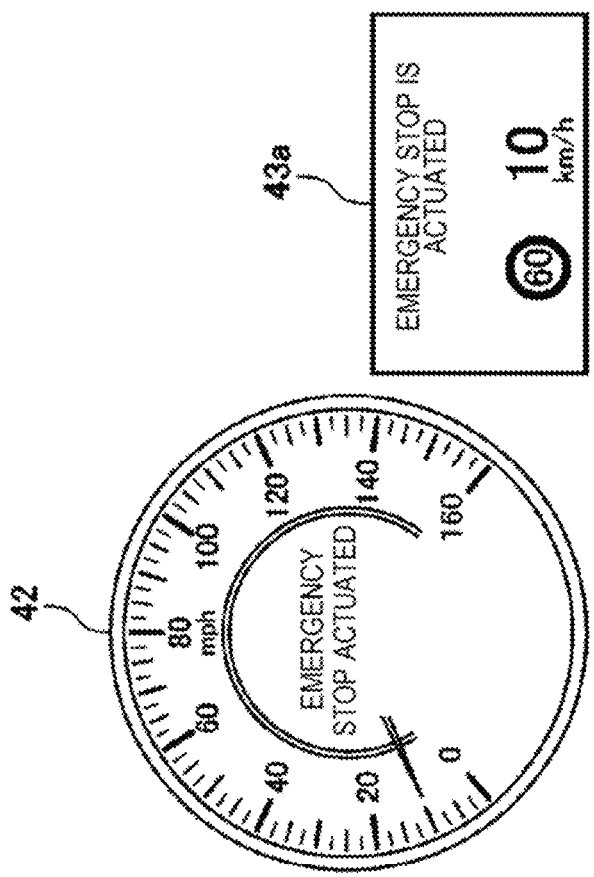
Figure 6C:
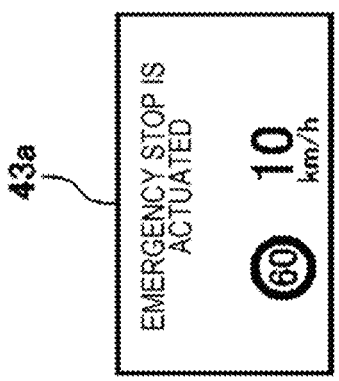

FIGS. 6A-6C illustrate screen examples that may be shown during the automatic stop control (that is, during the automated travel by the automatic stop control) in one or more embodiments of the present disclosure. In this case, as indicated by a reference sign and numeral A21 in Chart (A), i.e., FIG. 6A, the controller 10 can cause the center display 41 to show messages, "EMERGENCY STOP ACTUATED" and "MOVING TO SAFE LOCATION". In addition, as illustrated in Chart (B), i.e., FIG. 6B, the controller 10 can cause the meter device 42 to show a message, "EMERGENCY STOP ACTUATED". Furthermore, as illustrated in Chart (C), i.e., FIG. 6C, the controller 10 can show a message, "EMERGENCY STOP IS ACTUATED.", in the HUD image 43a (such a message may be shown only at initiation of the automatic stop control, and thus such a message may not be shown after the initiation of the automatic stop control). The controller 10 may further cause the center display 41 and the HUD image 43a to present further sensational emergency information.

As indicated by a reference sign and symbol A22 in Chart (A), i.e., FIG. 6A, the controller 10 can cause the center display 41 to show options of "CONTINUE" and "CANCEL" for the automatic stop control. In the case where the occupant including the driver selects the option of "CANCEL", which is shown in the center display 41, by operating the center console operation device 34, the controller 10 causes the audio output device 44 to output a message, "The vehicle stop by automated travel is cancelled.", and provides the screen as illustrated in FIGS. 5A-5C. Such options of "CONTINUE" and "CANCEL" are also shown in screens illustrated in FIG. 7A to FIG. 9C, which will be described below, in a similar manner (hereinafter a description thereon will appropriately be omitted).

Furthermore, as indicated by a reference sign and numeral A23 in Chart (A), i.e., FIG. 6C, the controller 10 can cause the center display 41 to show an image A23a of the vehicle (the host vehicle) 1 and images A23b, A23c of other vehicles (peripheral vehicles) around this vehicle 1. In this case, the controller 10 can identify the other vehicles on the basis of information (obstacle information) that is acquired by the outside camera 21 and/or the radar 22, and causes the images A23b, A23c of the identified other vehicles to be shown. In particular, the controller 10 causes the images A23b, A23c of the other vehicles to be shown in the form of a video that changes from time to time depending on a situation. When the center display 41 shows the images A23b, A23c of the other vehicles, it can be possible to notify the occupant (particularly, the occupant on the passenger's seat) that the host vehicle 1 currently executes the automatic stop control while appropriately comprehending the surrounding situation. In this way, it can be possible to give the occupant a sense of safety.

Then, after making such notification including the presentation of the images, the controller 10 can control the brake system of the vehicle 1 via the brake controller 47 (may further stop operation of the engine via the engine controller 46), and thereby decelerates the vehicle 1 to approximately 10 km/h.

Next, in step S15, the controller 10 can determine whether the vehicle 1 has to change the lane in order to stop the vehicle 1 at the safe location, more specifically, in order to stop the vehicle 1 on a road shoulder. That is, the controller 10 determines whether the lane, in which the vehicle 1 currently travels, (an own lane) is not connected to the road shoulder and thus the vehicle 1 has to be moved to a lane (a left lane) connected to the road shoulder. Basically, in the case where the vehicle 1 travels on a road with one lane in each direction, the own lane is connected to the road shoulder. Thus, the controller 10 determines that a lane change is unnecessary. On the other hand, in the case where the vehicle 1 travels in a lane other than the leftmost lane of a road with two or more lanes in each direction, the own lane is not connected to the road shoulder. Thus, the controller 10 can determine that the lane change is necessary. The controller 10 can make such a determination on the basis of the travel road information acquired by the outside camera 21 and the navigation system 31.

As a result of step S15, if the lane change is necessary (step S15: Yes), the processing proceeds to step S16 so as to attempt the lane change. In this case, the controller 10 first causes the audio output device 44 to output a message, "Attempting to change to the left lane". On the other hand, if the lane change is unnecessary (step S15: No), the lane change does not have to be attempted. Thus, the processing proceeds to step S18 by skipping steps S16, S17.

Next, in step S16, the controller 10 determines whether the lane change can be made. More specifically, the controller 10 calculates a time to collision (TTC) between the peripheral vehicle, which travels on the left lane as a destination, and the vehicle (the host vehicle) 1 on the basis of the obstacle information acquired by the outside camera 21 and/or the radar 22. Then, in the case where this TTC is equal to or longer than a specified value, the controller 10 determines that the lane change can be made. However, in the case where the lane, in which the vehicle 1 travels, is a lane, the lane change from which is prohibited (for example, in the case where the lane divider is a yellow solid line), the controller 10 determines that the lane change cannot be made. As a result of step S16, if the lane change can be made (step S16: Yes), the processing proceeds to step S17. On the other hand, if the lane change cannot be made (step S16: No), the processing proceeds to step S21. In this case, the controller 10 may cause the audio output device 44 to output a message, "The lane change is aborted".

Figures 7A, 7B, 7C:
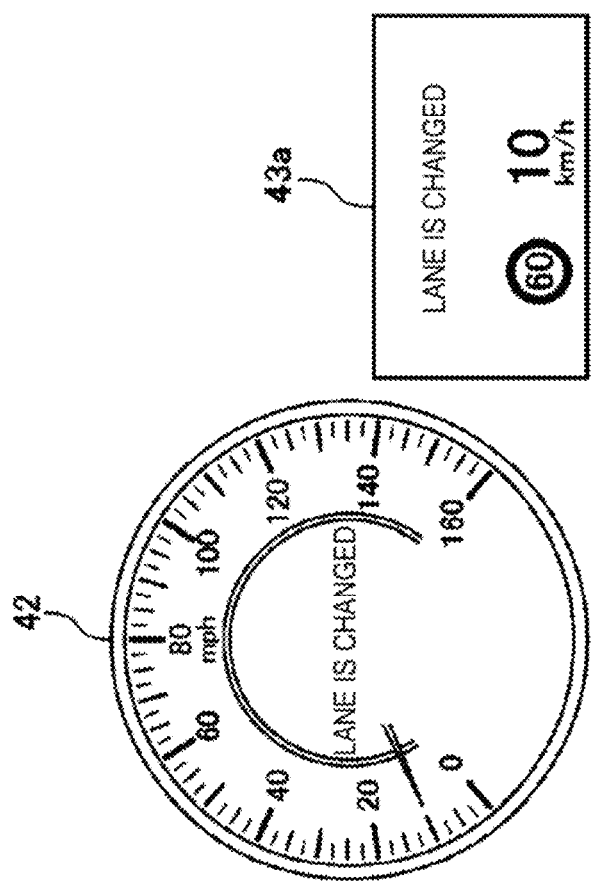
FIGS. 7A-7C illustrate screen examples that may be shown during a lane change in one or more embodiments of the present disclosure.

Next, in step S17, the controller 10 makes the specified notification and then makes the lane change of the vehicle 1. More specifically, the controller 10 causes the audio output device 44 to output a message, "The lane is changed". In addition, the controller 10 provides a screen as illustrated in FIGS. 7A-7C. FIGS. 7A-7C illustrate screen examples that may be shown during the lane change in one or more embodiments of the present disclosure. In this case, as indicated by a reference sign and numeral A31 in Chart (A), i.e., FIG. 7A, the controller 10 can cause the center display 41 to show messages, "EMERGENCY STOP ACTUATED" and "LANE IS CHANGED". In addition, as illustrated in Charts (B), (C), i.e., FIG. 7B and FIG. 7C, respectively, the controller 10 can cause the meter device 42 and the HUD image 43a to show a message "LANE IS CHANGED". In addition, as indicated by a reference sign and symbol A32 in Chart (A), i.e., FIG. 7A, the controller 10 can cause the center display 41 to show an image A32a of a situation where the vehicle 1 changes the lane. After making the notification including the presentation of the image, just as described, the controller 10 can execute control to change the steering direction of the vehicle 1 (the steering control) via the steering controller 48, that is, changes the advancing direction of the vehicle 1. In this way, the controller 10 can automatically changes the lane of the vehicle 1.

Next, in step S18, the controller 10 can determine whether the road shoulder, along which the vehicle 1 can be stopped at the safe location, exists. The controller 10 can make such a determination on the basis of the travel road information, which is acquired by the outside camera 21 and the navigation system 31. In addition, the controller 10 causes the audio output device 44 to output a message, "Searching for a safe location along the road shoulder". As a result of step S18, if the desired road shoulder exists (step S18: Yes), the processing proceeds to step S19. On the other hand, if the desired road shoulder does not exist (step S18: No), the processing proceeds to step S21. In this case, the controller 10 may cause the audio output device 44 to output a message, "Moving to the road shoulder is aborted".

Figure 8A:
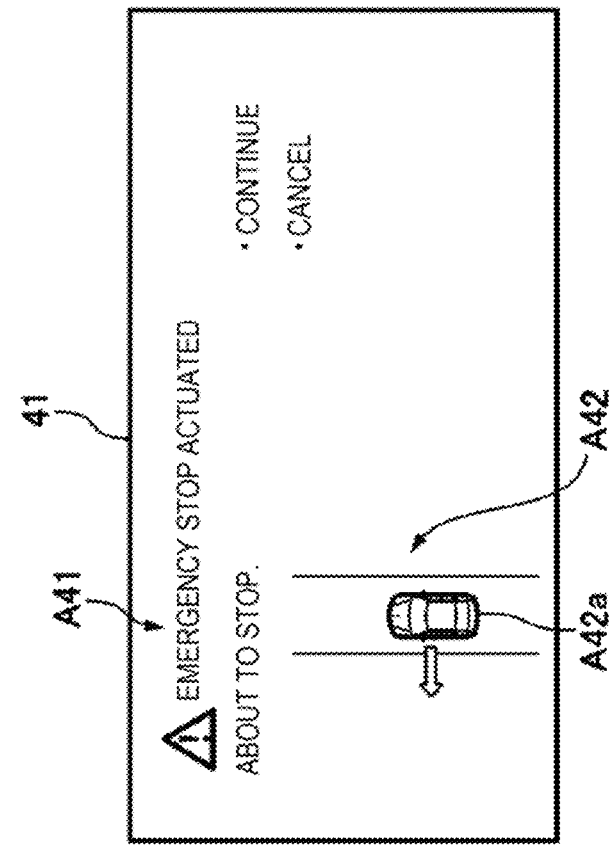
FIGS. 8A-8C illustrate screen examples that may be shown when the vehicle is about to be stopped in one or more embodiments of the present disclosure.
Figure 8B:
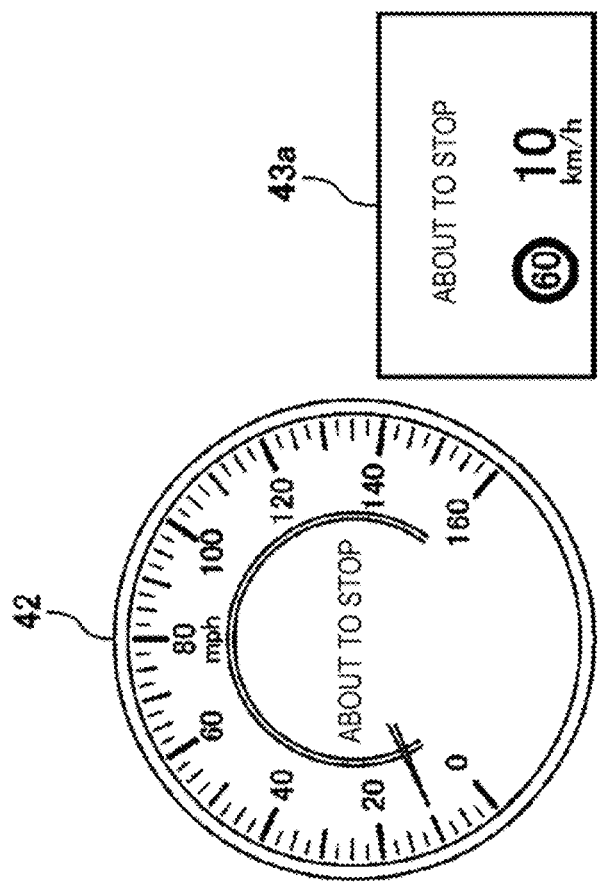
Figure 8C:

Next, in step S19, the controller 10 makes the specified notification and then moves the vehicle 1 to the road shoulder. More specifically, the controller 10 causes the audio output device 44 to output a message, "Stop in a safe space on the road shoulder". In addition, the controller 10 provides the screen as illustrated in FIGS. 8A-8C. FIGS. 8A-8C illustrate screen examples that may be shown when the vehicle 1 is about to be stopped in one or more embodiments of the present disclosure. In this case, as indicated by a reference sign and numeral A41 in Chart (A), i.e., FIG. 8A, the controller 10 can cause the center display 41 to show messages, "EMERGENCY STOP ACTUATED" and "ABOUT TO STOP." In addition, as illustrated in Charts (B), (C), i.e., FIG. 8B and FIG. 8C, respectively, the controller 10 can cause the meter device 42 and the HUD image 43a to show a message "ABOUT TO STOP". Furthermore, as indicated by a reference sign and symbol A42 in Chart (A), i.e., FIG. 8A, the controller 10 can cause the center display 41 to show an image A42a of a situation where the vehicle 1 is about to stop. After making the notification including the presentation of the image, just as described, the controller 10 can execute the control to change the steering direction of the vehicle 1 (the steering control) via the steering controller 48, that is, change the advancing direction of the vehicle 1. In this way, the controller 10 can move the vehicle 1 to the road shoulder.

Figure 9C:
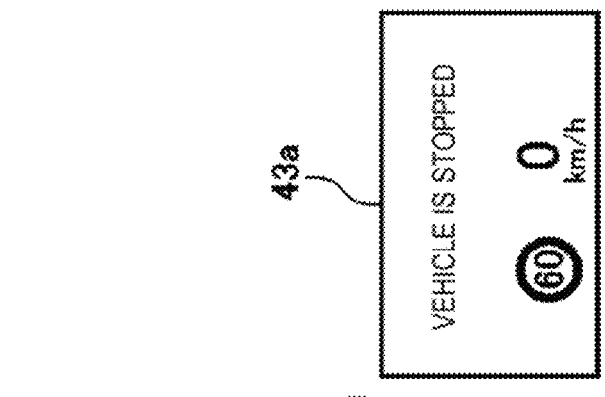
FIGS. 9A-9C illustrate screen examples that may be shown when the vehicle is stopped in one or more embodiments of the present disclosure.
Figure 9B:
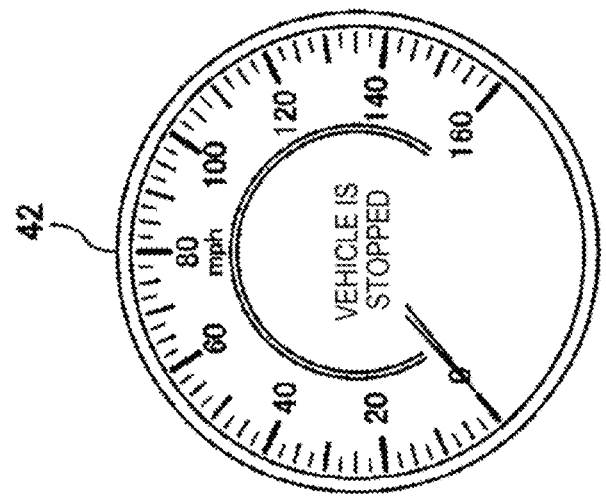
Figure 9A:
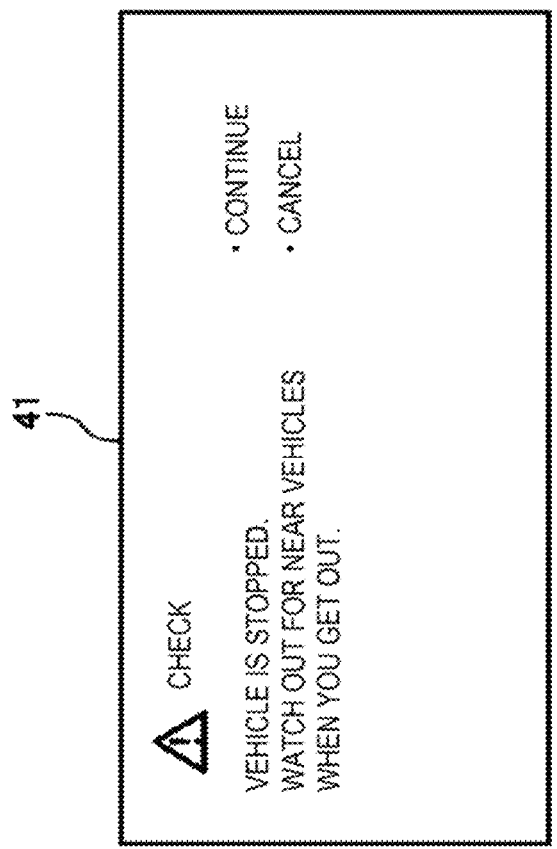

Next, in step S20, the controller 10 makes the specified notification and then stops the vehicle 1. More specifically, the controller 10 controls the brake system of the vehicle 1 via the brake controller 47, stops the operation of the engine via the engine controller 46, and thereby stops the vehicle 1. Then, the controller 10 cause the audio output device 44 to output a message, "The vehicle is stopped. Please check the safety around the vehicle when you get out". In addition, the controller 10 provides the screen as illustrated in FIGS. 9A-9C. FIGS. 9A-9C illustrate screen examples that may be shown when the vehicle 1 is stopped in one or more embodiments of the present disclosure. In this case, the controller 10 can cause the center display 41 to show a message, "VEHICLE IS STOPPED. WATCH OUT FOR NEAR VEHICLES WHEN YOU GET OUT". In addition, as illustrated in Charts (B), (C), i.e., FIG. 9B and FIG. 9C, respectively, the controller 10 can cause the meter device 42 and the HUD image 43a to show a message "VEHICLE IS STOPPED".

Meanwhile, in step S21, the controller 10 can determine whether the intersection is absent ahead of the vehicle 1. The controller 10 can make such a determination on the basis of the travel road information, which is acquired by the outside camera 21 and the navigation system 31. As a result, if the intersection is present (step S21: No), the processing proceeds to step S20. In this case, the controller 10 makes the specified notification and stops the vehicle 1. More specifically, the controller 10 causes the audio output device 44 to output a message, "The vehicle stops before entering the intersection. The vehicle does not start again". Thereafter, the controller 10 controls the brake system of the vehicle 1 via the brake controller 47, stops the operation of the engine via the engine controller 46, and thereby stops the vehicle 1 before the intersection. Then, the controller 10 cause the audio output device 44 to output a message, "The vehicle is stopped. Please check the safety around the vehicle when you get out", and shows a screen as illustrated in FIGS. 9A-9C.

On the other hand, as a result of step S21, if the intersection is absent (step S21: Yes), the processing proceeds to step S22. In step S22, the controller 10 can determine whether a temporary stop of the vehicle 1 is unmade. More specifically, the controller 10 can determine whether the temporary stop of the vehicle 1 is unmade due to absence of a location where the vehicle 1 should temporarily be stopped, heavy traffic, or the like. Such a location has the signal, a level crossing, or a stop sign based on a traffic regulation. The controller 10 can make such a determination on the basis of the travel road information, which is acquired by the outside camera 21 and the navigation system 31. As a result, if the vehicle 1 is temporarily stopped (step S22: No), the processing proceeds to step S20. In this case, the controller 10 makes the specified notification and stops the vehicle 1. More specifically, the controller 10 causes the audio output device 44 to output a message, "The vehicle is stopped here. The vehicle does not start again". Thereafter, the controller 10 controls the brake system of the vehicle 1 via the brake controller 47, stops the operation of the engine via the engine controller 46, and thereby stops the vehicle 1 at a specified location. Then, the controller 10 cause the audio output device 44 to output the message, "The vehicle is stopped. Please check the safety around the vehicle when you get out", and shows the screen as illustrated in FIGS. 9A-9C.

On the other hand, as a result of step S22, if the temporary stop of the vehicle 1 is unmade (step S22: Yes), the processing proceeds to step S23. In step S23, the controller 10 determines whether a specified time has elapsed since initiation of the processing in step S14, that is, since the automatic stop control is actually initiated. As this specified time, a time that is shorter than the specified limit time (for example, 3 minutes) from the initiation of the automatic stop control to the stop of the vehicle 1 by approximately 10 seconds is applied, for example. As a result of step S23, if the specified time has elapsed (step S23: Yes), the processing proceeds to step S20. In this case, the controller 10 makes the specified notification and stops the vehicle 1. More specifically, the controller 10 causes the audio output device 44 to output a message, "An appropriate evacuation place is unavailable up ahead. The vehicle is promptly stopped from now on". Thereafter, the controller 10 controls the brake system of the vehicle 1 via the brake controller 47, stops the operation of the engine via the engine controller 46, and thereby stops the vehicle 1 promptly. Then, the controller 10 cause the audio output device 44 to output the message, "The vehicle is stopped. Please check the safety around the vehicle when you get out", and shows the screen as illustrated in FIGS. 9A-9C. On the other hand, if the specified time has not elapsed (step S23: No), the processing returns to step S15. In this case, the controller 10 can repeat the above-described processing (particularly, steps S15 to S18, S21 to S23) until the lapse of the specified time.

Operation and Effects

Next, a description will be made regarding operation and exemplary effects of the vehicle control system 100 according to one or more embodiments of the present disclosure.

In this embodiment, the controller 10 can at least perform, as the automatic stop control: the operation to decelerate the vehicle 1 to the specified vehicle speed when the driver abnormality is determined (first operation); the operation to further decelerate and stop the vehicle 1 after the first operation (second operation); the operation to change the lane of the vehicle 1 between the first operation and the second operation (third operation); and the operation to move the vehicle 1 to the road shoulder between the first operation and the second operation (fourth operation). Then, the controller 10 can cause at least one of the center display 41, the meter device 42, the HUD 43, and the audio output device 44 to notify of the operation to be performed of the first to fourth operations, and can further cause at least one thereof to notify of a stop of the operation when the operation to be performed of the first to fourth operations is stopped.

According to this embodiment and optionally other embodiments, it can be possible to sequentially notify the occupants including the driver of the vehicle 1 of various control aspects that can be adopted by the vehicle 1 during the automatic stop control in the case where the abnormality occurs to the driver and this automatic stop control is thereby executed. More specifically, it can be possible to sequentially notify the occupants of the operation of the vehicle 1 to be performed (including operation, performance of which is being attempted), the operation of the vehicle 1 that is stopped as being unperformable (for example, the lane change that cannot be made due to the surrounding situation of the host vehicle 1), and the like. In this way, the occupant can sequentially comprehend the control aspect that can be adopted by the vehicle 1 during the automatic stop control. Therefore, it can be possible to dispel the occupant's anxiety about future behavior of the vehicle 1, that is, it can be possible to give the occupant the sense of safety.

According to one or more embodiments of the present disclosure, in the case where the third or fourth operation is stopped, the controller 10 can notify that the third or fourth operation is stopped and that the second operation is performed from now on. Thereafter, the controller 10 can perform the second operation so as to stop the vehicle 1 at a position other than that in the change destination lane or a position other than the road shoulder. In this way, the occupant can appropriately comprehend that the vehicle is stopped at the position other than that in the lane change destination or at the position other than the road shoulder, typically, that the vehicle 1 is stopped in the own lane.

According to one or more embodiments of the present disclosure, in the case where the first operation is performed, the controller 10 can notify that the vehicle 1 is stopped within the specified time. In the case where the third or fourth operation cannot be executed within the specified time, the controller 10 can notify that the third or fourth operation is stopped and that the second operation is performed from now on. Thereafter, the controller 10 can perform the second operation so as to stop the vehicle 1 within the specified time. In this way, the occupant can appropriately comprehend that the vehicle is promptly stopped from now on because the time runs out, typically, that the vehicle 1 is promptly stopped in the own lane.

According to one or more embodiments of the present disclosure, in the case where the intersection exists ahead of the vehicle 1 after the first operation, the controller 10 can notify that the second operation is performed from now on. Thereafter, the controller 10 can perform the second operation to stop the vehicle 1 before the vehicle 1 enters the intersection. In this way, the occupant can appropriately comprehend that, after the vehicle 1 is stopped before entering the intersection, the vehicle remains stopped and thus does not start again.

According to one or more embodiments of the present disclosure, in the case where the vehicle 1 is temporarily stopped according to the surrounding situation after the first operation, the controller 10 can notify that the second operation is performed from now on. Thereafter, the controller 10 can perform the second operation to stop the vehicle 1 according to the surrounding situation. In this way, the occupant can appropriately comprehend that, after the vehicle 1 is stopped according to the surrounding situation, the vehicle remains stopped and thus does not start again.

Modified Examples

In the one or more embodiments described above, the vehicle 1 can be stopped within the specified limit time since the initiation of the automatic stop control. However, in another example, the vehicle 1 may be stopped before the vehicle 1 passes the specified number (for example, three) of intersections since the initiation of the automatic stop control. In further another example, the vehicle 1 may be stopped before the vehicle 1 travels for a specified distance (for example, 200 m) since the initiation of the automatic stop control.

The invention claimed is:

1. A vehicle control system for controlling a vehicle, comprising:
a driver monitor that monitors a state of a driver;
a notifier that notifies an occupant of the vehicle, including the driver, of specified information regarding an automatic stop of the vehicle visually and/or auditorily; and
a controller configured to:
execute automatic stop control to automatically stop the vehicle emergently, and
execute control to cause the notifier to notify of the specified information regarding the automatic stop of the vehicle under a condition where a driver abnormality is determined based on the state of the driver monitored by the driver monitor,
wherein the controller is further configured to:
perform, as part of the automatic stop control, a first operation to decelerate the vehicle to a specified vehicle speed under a condition where the driver abnormality is determined, a second operation to further decelerate and stop the vehicle after the first operation, a third operation to change a lane of the vehicle temporally between the first operation and the second operation, in a case where lane change is determined to be possible, and a fourth operation to move the vehicle to a road shoulder temporally between the first operation and the second operation in a case where the road shoulder is determined to exist, and
wherein the controller is further configured to:
cause the notifier to notify of an operation to be performed from among the first to fourth operations,
cause the notifier to notify of prevention of an operation to be performed from among the third operation or the fourth operation in the case where the third operation or the fourth operation to be performed is determined to no longer be performed, and
prevent the third operation from being performed in a case where the lane change is determined not to be possible, followed by performing the second operation, without performing the fourth operation, to further decelerate and stop the vehicle.

2. The vehicle control system according to claim 1, wherein the controller is configured to cause the notifier to notify that the third or fourth operation is stopped and that the second operation is performed upon the third or fourth operation being stopped and thereafter to perform the second operation so as to stop the vehicle at a first position other than a second position in a lane change destination or a third position other than the road shoulder.

3. The vehicle control system according to claim 2, wherein the controller is configured to:
cause the notifier to notify that the vehicle is stopped within a specified time when the first operation is performed; and
cause the notifier to notify that the third or fourth operation is stopped and that the second operation is performed under a condition where the third or fourth operation cannot be performed within the specified time, and thereafter to perform the second operation so as to stop the vehicle within the specified time.

4. The vehicle control system according to claim 3, wherein the controller is configured to cause the notifier to notify that the second operation is performed under a condition where an intersection exists ahead of the vehicle after the first operation, and thereafter to perform the second operation so as to stop the vehicle before the vehicle enters the intersection.

5. The vehicle control system according to claim 4, wherein the controller is configured to cause the notifier to notify that the second operation is performed under a condition where the vehicle is temporarily stopped according to a surrounding situation after the first operation, and thereafter to perform the second operation so as to stop the vehicle according to the surrounding situation.

6. The vehicle control system according to claim 1, wherein the controller is configured to:
cause the notifier to notify that the vehicle is stopped within a specified time when the first operation is performed; and
cause the notifier to notify that the third or fourth operation is stopped and that the second operation is performed under a condition where the third or fourth operation cannot be performed within the specified time, and thereafter to perform the second operation so as to stop the vehicle within the specified time.

7. The vehicle control system according to claim 1, wherein the controller is configured to cause the notifier to notify that the second operation is performed under a condition where an intersection exists ahead of the vehicle after the first operation, and thereafter to perform the second operation so as to stop the vehicle before the vehicle enters the intersection.

8. The vehicle control system according to claim 1, wherein the controller is configured to cause the notifier to notify that the second operation is performed under a condition where the vehicle is temporarily stopped according to a surrounding situation after the first operation, and thereafter to perform the second operation so as to stop the vehicle according to the surrounding situation.

9. The vehicle control system according to claim 2, wherein the controller is configured to cause the notifier to notify that the second operation is performed under a condition where an intersection exists ahead of the vehicle after the first operation and thereafter to perform the second operation so as to stop the vehicle before the vehicle enters the intersection.

10. The vehicle control system according to claim 2, wherein the controller is configured to cause the notifier to notify that the second operation is performed under a condition where the vehicle is temporarily stopped according to a surrounding situation after the first operation and thereafter to perform the second operation so as to stop the vehicle according to the surrounding situation.

11. The vehicle control system according to claim 3, wherein the controller is configured to cause the notifier to notify that the second operation is performed under a condition where the vehicle is temporarily stopped according to a surrounding situation after the first operation and thereafter to perform the second operation so as to stop the vehicle according to the surrounding situation.

12. The vehicle control system according to claim 6, wherein the controller is configured to cause the notifier to notify that the second operation is performed under a condition where an intersection exists ahead of the vehicle after the first operation and thereafter to perform the second operation so as to stop the vehicle before the vehicle enters the intersection.

13. The vehicle control system according to claim 6, wherein the controller is configured to cause the notifier to notify that the second operation is performed under a condition where the vehicle is temporarily stopped according to a surrounding situation after the first operation and thereafter to perform the second operation so as to stop the vehicle according to the surrounding situation.

14. The vehicle control system according to claim 7, wherein the controller is configured to cause the notifier to notify that the second operation is performed under a condition where the vehicle is temporarily stopped according to a surrounding situation after the first operation and thereafter to perform the second operation so as to stop the vehicle according to the surrounding situation.

15. The vehicle control system according to claim 9, wherein the controller is configured to cause the notifier to notify that the second operation is performed under a condition where the vehicle is temporarily stopped according to a surrounding situation after the first operation and thereafter to perform the second operation so as to stop the vehicle according to the surrounding situation.

16. The vehicle control system according to claim 12, wherein the controller is configured to cause the notifier to notify that the second operation is performed under a condition where the vehicle is temporarily stopped according to a surrounding situation after the first operation and thereafter to perform the second operation so as to stop the vehicle according to the surrounding situation.

17. The vehicle control system according to claim 1, wherein the controller is configured to:
    determine existence of an upcoming intersection after preventing the third operation from being performed, and
    perform the second operation to further decelerate and stop the vehicle prior to the vehicle reaching the intersection.

18. The vehicle control system according to claim 1, wherein the controller is configured to prevent the fourth operation from being performed in a case where the road shoulder is determined not to exist, followed by performing the second operation to further decelerate and stop the vehicle.

19. The vehicle control system according to claim 18, wherein the controller is configured to:
    determine existence of an upcoming intersection after preventing the fourth operation from being performed, and
    perform the second operation to further decelerate and stop the vehicle prior to the vehicle reaching the intersection.

20. A vehicle control system for controlling a vehicle, comprising:
    a driver monitor that monitors a state of a driver;
    a notifier that notifies an occupant of the vehicle, including the driver, of specified information regarding an automatic stop of the vehicle visually and/or auditorily; and
    a controller configured to;
        execute automatic stop control to automatically stop the vehicle emergently, and
        execute control to cause the notifier to notify of the specified information regarding the automatic stop of the vehicle under a condition where a driver abnormality is determined based on the state of the driver monitored by the driver monitor,
    wherein the controller is further configured to:
        perform, as part of the automatic stop control, a first operation to decelerate the vehicle to a specified vehicle speed under a condition where the driver abnormality is determined, a second operation to further decelerate and stop the vehicle after the first operation, a third operation to change a lane of the vehicle temporally between the first operation and the second operation, in a case where lane change is determined to be possible, and a fourth operation to move the vehicle to a road shoulder temporally between the first operation and the second operation in a case where the road shoulder is determined to exist, and
    wherein the controller is further configured to:
        cause the notifier to notify of an operation to be performed from among the first to fourth operations,
        prevent the third operation from being performed in a case where the lane change is determined not to be possible and a specified time has elapsed from start of the first operation, followed by performing the second operation, without performing the fourth operation, to further decelerate and stop the vehicle,
        prevent the fourth operation from being performed in a case where the road shoulder is determined not to exist and the specified time has elapsed from start of the first operation, followed by performing the second operation to further decelerate and stop the vehicle,
        cause the notifier to notify of prevention of an operation to be performed from among the third operation or the fourth operation in the case where the third operation or the fourth operation to be performed is determined to no longer be performed, and
        cause the notifier to notify of the second operation to further decelerate and stop the vehicle in a case where the third operation or the fourth operation is prevented from occurring and the specified time has elapsed from start of the first operation.

* * * * *